(12) United States Patent
Shaeff et al.

(10) Patent No.: US 10,821,790 B2
(45) Date of Patent: Nov. 3, 2020

(54) LATERALLY ARTICULATING RECEIVER SYSTEM

(71) Applicant: Ford Global Technologies, LLC, Dearborn, MI (US)

(72) Inventors: Nathan Shaeff, West Bloomfield, MI (US); David R. Huelke, Milan, MI (US); Joe Buchwitz, Huntington Woods, MI (US); James Drozdowski, Chelsea, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 208 days.

(21) Appl. No.: 15/958,796

(22) Filed: Apr. 20, 2018

(65) Prior Publication Data

US 2019/0322144 A1    Oct. 24, 2019

(51) Int. Cl.
*B60D 1/40* (2006.01)
*B60D 1/52* (2006.01)
*B60D 1/24* (2006.01)
*B60D 1/44* (2006.01)

(52) U.S. Cl.
CPC ............ *B60D 1/40* (2013.01); *B60D 1/246* (2013.01); *B60D 1/44* (2013.01); *B60D 1/52* (2013.01)

(58) Field of Classification Search
CPC .......... B60D 1/245; B60D 1/246; B60D 1/44; B60D 1/40; B62D 13/00
USPC ........................................................ 280/469
See application file for complete search history.

(56) References Cited

U.S. PATENT DOCUMENTS

| | | | | |
|---|---|---|---|---|
| 852,746 A * | 5/1907 | Stevig | ............. | B60D 1/44 280/470 |
| 1,130,311 A * | 3/1915 | Mast | ............. | B60D 1/44 280/470 |
| 1,162,946 A * | 12/1915 | Olson | ............. | B60D 1/44 280/470 |
| 1,235,082 A * | 7/1917 | Brethorst | ............. | B60D 1/44 280/470 |
| 1,362,857 A * | 12/1920 | Engh | ............. | B60D 1/44 280/470 |
| 1,366,842 A * | 1/1921 | Smith | ............. | B60D 1/44 280/469 |
| 1,405,916 A * | 2/1922 | Heenan | ............. | B62D 13/00 280/470 |
| 1,450,526 A * | 4/1923 | Timmis | ............. | B62D 13/00 280/470 |
| 1,542,581 A * | 6/1925 | Prilipp | ............. | B60D 1/44 280/467 |

(Continued)

OTHER PUBLICATIONS

Morrison, Jr., J.E., Technical Notes: Lateral Hitch Positioner Attachment, Applied Engineering in Agriculture 7(6): 689-690; 1991, https://elibrary.asabe.org/abstract.asp?aid=26287&t=2&redir=&redirType=.

*Primary Examiner* — Joseph M Rocca
*Assistant Examiner* — Conan D Duda
(74) *Attorney, Agent, or Firm* — David Coppiellie; Carlson, Gaskey & Olds, P.C.

(57) ABSTRACT

A disclosed hitch receiver assembly includes receiver having a worm gear and a slide bushing, a worm shaft engaged to the worm gear for laterally moving the receiver, a slide bar extending through the slide bushing and fixed at each end to a static structure, a hitch received within the receiver and a receiver pin coupling the hitch to the receiver and the static structure.

18 Claims, 7 Drawing Sheets

(56) References Cited

U.S. PATENT DOCUMENTS

| | | | | |
|---|---|---|---|---|
| 1,574,716 A * | 2/1926 | Warren | B60D 1/44 | 280/447 |
| 1,637,854 A * | 8/1927 | Burbach | B60D 1/44 | 280/469 |
| 1,830,874 A * | 11/1931 | Hendrickson | B60D 1/44 | 280/448 |
| 2,025,820 A * | 12/1935 | Miller | B62D 13/00 | 280/447 |
| 2,414,248 A * | 1/1947 | Townsend | B60D 1/44 | 280/447 |
| 2,653,031 A * | 9/1953 | Butler | B60D 1/44 | 280/468 |
| 2,788,226 A * | 4/1957 | Malone | B62D 49/065 | 280/447 |
| 2,890,896 A * | 6/1959 | Hendrickson | B60D 1/44 | 280/467 |
| 2,917,323 A * | 12/1959 | Mandekic | B60D 1/44 | 280/470 |
| 2,947,551 A * | 8/1960 | Reimers | B60D 1/44 | 280/499 |
| 3,172,685 A * | 3/1965 | Mandekic | B62D 13/005 | 280/408 |
| 3,178,203 A * | 4/1965 | Elliott | B62D 13/00 | 280/470 |
| 3,677,565 A * | 7/1972 | Slosiarek | B60D 1/44 | 280/499 |
| 3,891,239 A * | 6/1975 | Leo | B60D 1/42 | 280/479.1 |
| 4,019,754 A * | 4/1977 | Hinckley | B60D 1/173 | 280/456.1 |
| 4,060,255 A * | 11/1977 | Zimmerman | B60D 1/44 | 280/478.1 |
| 4,153,132 A * | 5/1979 | Biedebach | B62D 13/00 | 180/420 |
| 4,159,833 A * | 7/1979 | Meiners | B60D 1/50 | 267/138 |
| 4,214,772 A * | 7/1980 | Carr | B60D 1/07 | 280/416.1 |
| 4,929,028 A * | 5/1990 | Underwood | B60D 1/42 | 280/490.1 |
| 4,961,589 A * | 10/1990 | Faurenhoff | B60D 1/44 | 248/352 |
| 5,102,156 A * | 4/1992 | Fink | B60D 1/485 | 280/495 |
| 5,193,837 A * | 3/1993 | Fink | B60D 1/44 | 280/495 |
| 5,511,813 A * | 4/1996 | Kravitz | B60D 1/42 | 280/495 |
| 5,716,066 A * | 2/1998 | Chou | B60D 1/488 | 280/460.1 |
| 5,845,921 A | 12/1998 | Stimac | | |
| 6,220,618 B1 * | 4/2001 | Smith | B60D 1/34 | 280/447 |
| 6,443,475 B1 * | 9/2002 | Fegley | B60D 1/44 | 280/463 |
| 6,634,666 B2 | 10/2003 | Shilitz et al. | | |
| 6,974,146 B2 | 12/2005 | Abair | | |
| 7,651,114 B2 * | 1/2010 | Weber | B60D 1/36 | 254/419 |
| 8,016,314 B2 | 9/2011 | Visser | | |
| 8,091,913 B1 | 1/2012 | White | | |
| 8,905,424 B2 | 12/2014 | Williams, Jr. et al. | | |
| 9,796,226 B2 | 10/2017 | Turner et al. | | |
| 10,308,086 B2 * | 6/2019 | Tiainen | B60D 1/245 | |
| 10,328,758 B2 * | 6/2019 | Parks | B60D 1/187 | |
| 2002/0089147 A1 | 7/2002 | Shilitz | B60D 1/36 | 280/470 |
| 2002/0185838 A1 * | 12/2002 | Shilitz | B60D 1/36 | 280/467 |
| 2003/0132605 A1 * | 7/2003 | Wiers | B60D 1/18 | 280/468 |
| 2003/0137126 A1 | 7/2003 | Reuter et al. | | |
| 2004/0021292 A1 * | 2/2004 | Abair | B60D 1/246 | 280/456.1 |
| 2010/0213687 A1 * | 8/2010 | McDaniel | B60D 1/06 | 280/491.2 |
| 2011/0018231 A1 * | 1/2011 | Collenberg | B60D 1/06 | 280/448 |
| 2012/0112433 A1 * | 5/2012 | Williams, Jr. | B60D 1/04 | 280/490.1 |
| 2016/0187888 A1 * | 6/2016 | Turner | B60D 1/36 | 701/49 |
| 2017/0079191 A1 | 3/2017 | Cunningham et al. | | |
| 2017/0240010 A1 * | 8/2017 | Tiainen | B60D 1/245 | |
| 2018/0126811 A1 * | 5/2018 | Shaffer | B60D 1/42 | |
| 2018/0354323 A1 * | 12/2018 | Maynard, Jr. | B60D 1/44 | |
| 2019/0118595 A1 * | 4/2019 | Yoshizaki | B60D 1/62 | |
| 2019/0322144 A1 * | 10/2019 | Shaeff | B60D 1/246 | |

* cited by examiner

LATERALLY ARTICULATING RECEIVER SYSTEM

TECHNICAL FIELD

This disclosure relates to a hitch receiver for a motor vehicle that is movable to aid in alignment with a trailer hitch.

BACKGROUND

Vehicles that tow trailers include a hitch receiver assembly that supports a hitch ball. The hitch ball is fixed to a sturdy part of the vehicle frame. Backing a vehicle with the fixed hitch ball often results in some misalignment. The process is then repeated until the hitch ball is sufficiently aligned with the trailer hitch. The process of aligning the trailer hitch and hitch ball by the vehicle operator alone can be difficult. Moreover, even with the aid of another person or a rear view camera system, some circumstances will exist that complicate precise alignment by moving the tow vehicle.

Automotive manufactures continually pursue improvements to vehicle performance, convenience and utility to improve and maintain customer approval and loyalty.

SUMMARY

A hitch receiver assembly according to an exemplary embodiment of the present disclosure includes, among other things, a receiver including a worm gear and a slide bushing, a worm shaft engaged to the worm gear for laterally moving the receiver, a slide bar extending through the slide bushing and fixed at each end to a static structure, a hitch received within the receiver and receiver pin coupling the hitch to the receiver and the static structure.

In a further non-limiting embodiment of the foregoing hitch receiver assembly, the static structure includes a slide box, the slide box including bearings supporting rotation of the worm shaft and fixed sides engaged to fix the slide bar.

In a further non-limiting embodiment of any of the foregoing hitch receiver assemblies, the slide bushing comprises a running fit to the slide bar such that the receiver is movable laterally along the slide bar.

In a further non-limiting embodiment of any of the foregoing hitch receiver assemblies, a motor rotates the worm shaft to move the receiver laterally relative to the slide box In a further non-limiting embodiment of any of the foregoing hitch receiver assemblies, the slide box includes openings vertically aligned with openings within the receiver and the hitch and in a coupled position the receiver pin extends through openings in the slide box, receiver and hitch to couple the hitch to the static structure.

In a further non-limiting embodiment of any of the foregoing hitch receiver assemblies, a handle is pivotally attached to the receiver pin, the handle movable from a stowed position to an extended position for withdrawal from the receiver and hitch to a decoupled position.

In a further non-limiting embodiment of any of the foregoing hitch receiver assemblies, the receiver pin includes a gear portion engaged to an actuator for moving the receiver pin between the coupled position and a decoupled position.

In a further non-limiting embodiment of any of the foregoing hitch receiver assemblies, the receiver pin is received vertically through the openings.

In a further non-limiting embodiment of any of the foregoing hitch receiver assemblies, the receiver pin is movable along a vertical axis and the slide bar is disposed along a horizontal axis spaced a distance part from the vertical axis, wherein the first distance is no less than 4 times a width of the receiver pin.

In a further non-limiting embodiment of any of the foregoing hitch receiver assemblies, the distance between the vertical axis and the horizontal axis is between 4 and 8 times a width of the receiver pin.

A hitch receiver assembly according to an another exemplary embodiment of the present disclosure includes, among other things, a slide box attached to a static structure, a receiver movable within the slide box and including a worm gear and a bushing, a worm shaft engaged to the worm gear, a slide bar extending along a horizontal axis through the bushing, a hitch received within the receiver and a receiver pin extending along a vertical axis spaced apart from the horizontal axis a distance no less than 4 times a width of the receiver pin.

In a further non-limiting embodiment of the foregoing hitch receiver assembly, the distance is between 4 and 8 times a width of the receiver pin.

In a further non-limiting embodiment of any of the foregoing hitch receiver assemblies, the slide box supports rotation of the worm shaft and includes fixed sides holding the slide bar.

In a further non-limiting embodiment of any of the foregoing hitch receiver assemblies, a motor rotates the worm shaft to move the receiver laterally relative to the slide box.

In a further non-limiting embodiment of any of the foregoing hitch receiver assemblies, the slide box includes openings vertically aligned with openings within the receiver and the hitch and in a coupled position the receiver pin extends through openings in the slide box, receiver and hitch to couple the hitch to the static structure, wherein a handle is pivotally attached to the receiver pin and is movable from a stowed position to an extended position for withdrawing the receiver pin to a decoupled position.

In a further non-limiting embodiment of any of the foregoing hitch receiver assemblies, the slide box includes openings vertically aligned with openings within the receiver and the hitch and in a coupled position the receiver pin extends through openings in the slide box, receiver and hitch to couple the hitch to the slide box, the receiver pin including a gear portion engaged to an actuator for moving the receiver pin between the coupled position and a decoupled position.

A method of assembling a hitch receiver assembly according to another exemplary embodiment of the present disclosure includes, among other things, fixing a slide box to a static structure, assembling a bushing and a worm gear to a receiver and placing the receiver into a space defined within the slide box, placing a worm shaft into engagement with the worm gear, fixing a slide bar along a horizontal axis through the bushing and sides of the slide box, inserting a hitch into the receiver and coupling the hitch, receiver and slide box together with a receiver pin extending along a vertical axis that is spaces apart from the horizontal axis a distance no less than 4 times a width of the receiver pin.

In a further non-limiting embodiment of the foregoing method, a motor is coupled to the worm shaft to drive the receiver laterally within the slide box.

In a further non-limiting embodiment of any of the foregoing methods, an actuator is coupled to the gear teeth on the receiver pin to move the receiver pin between a coupled position and a decoupled position.

The various features and advantages of this disclosure will become apparent to those skilled in the art from the following detailed description. The drawings that accompany the detailed description can be briefly described as follows.

DETAILED DESCRIPTION

Figure 1:
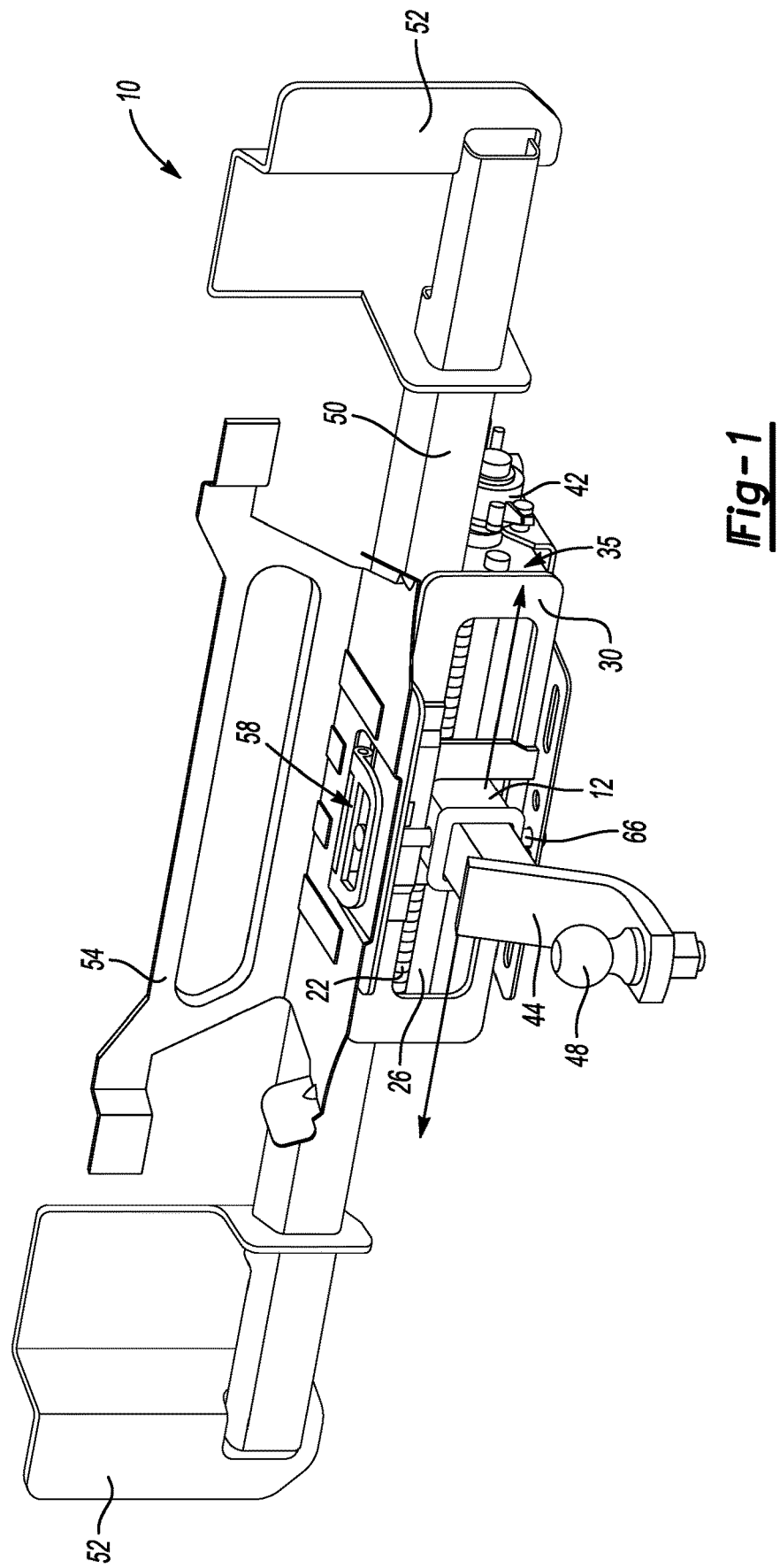
FIG. 1 is a perspective view of an example hitch assembly embodiment.
Figure 2:
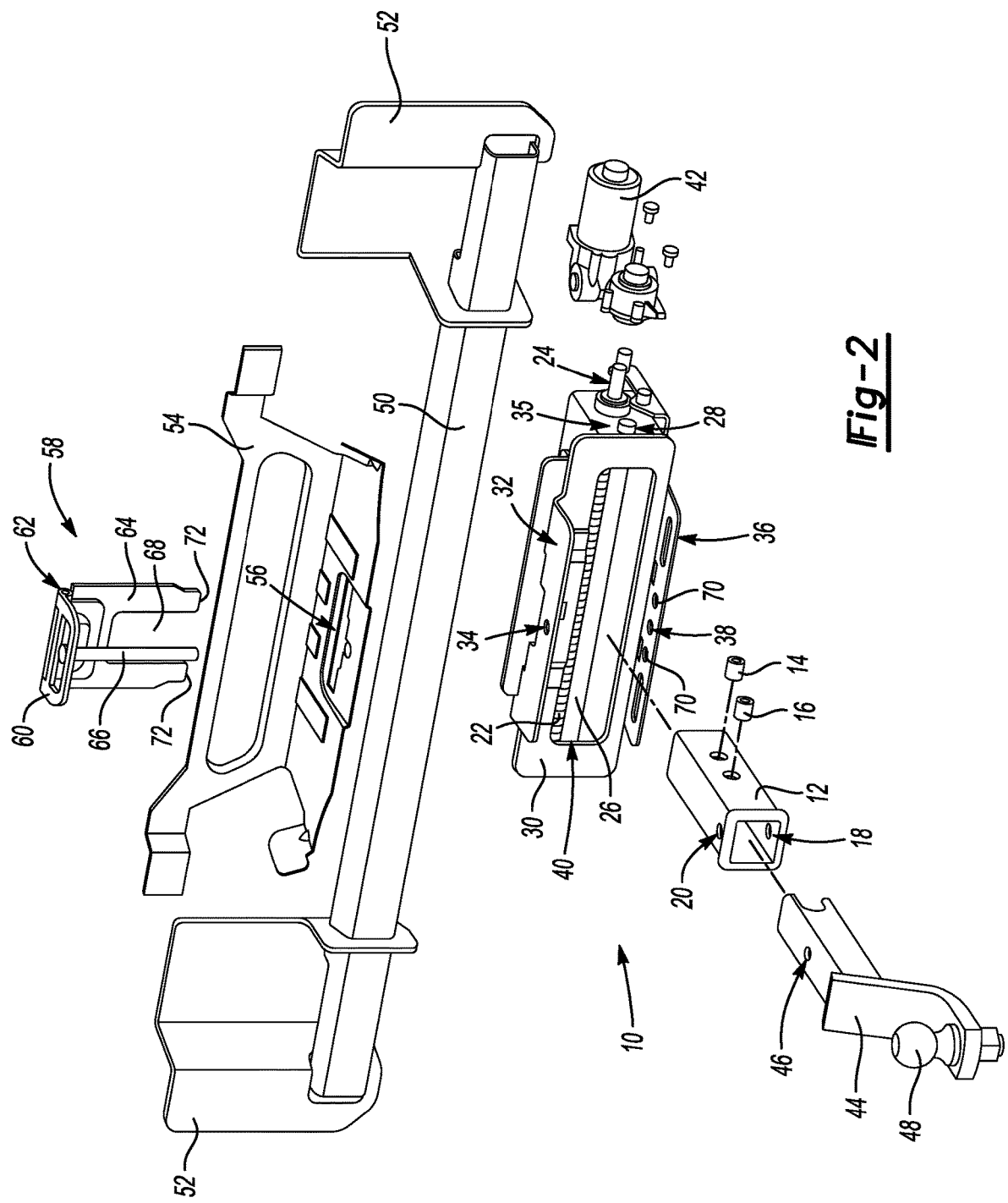
FIG. 2 is an exploded view of the example hitch assembly embodiment.

Referring to FIGS. 1 and 2 an example automated hitch assembly 10 includes a hitch receiver 12 that is laterally movable within a slide box 30. Lateral movement of the hitch receiver 12 enables a hitch ball 48 to be moved laterally relative to a center plane of a motor vehicle to aid in coupling to a trailer hitch.

The example hitch receiver 12 is supported within the slide box 30 along a slide bar 26. The slide box 30 is permanently attached to a static structures of the vehicle such as beam 50 and side members 52. The example slide box 30 includes top 32, bottom 36, and sides 35 that support mechanisms for moving the hitch receiver 12 laterally relative to a central position.

The hitch receiver 12 includes an opening 18 for receiving the hitch 44. The hitch receiver 12 further includes a slide bushing 16 and a worm gear 14. A worm shaft 22 is supported within the slide box 30 and includes end 24 that is coupled to a motor 42. The worm shaft 22 engages the worm gear 14 of the hitch receiver 12. Rotation of the motor 42 drives the worm shaft 22 to move the worm gear 14 and thereby the receiver 12 laterally within the slide box 30.

The slide bushing 16 is movably coupled to the slide bar 26. The slide bar 26 is supported at ends 28 at each side 35 of the slide box 30. The fit between the slide bushing 16 and the slide bar 26 is a running clearance fit that provides stability for the receiver 12.

The top 32 includes opening 34 and the bottom 36 includes opening 38 for a hitch pin 66. The hitch pin 66 is part of a hitch pin assembly 58. The hitch pin assembly 58 includes the hitch pin 66 that is pivotally attached by pivot 62 to a handle 60. Additionally, a locking bracket 64 is attached by way of the pivot 62 to the hitch pin 66. The locking brackets 64 includes tabs 72 that are received within slots 70 disposed within the bottom 36 of the slide box 30.

The hitch pin 66 extends through openings 34 of the top 32, opening 20 within the receiver 12, opening 46 within the hitch 44 and opening 38 within the bottom 36 when in a locked position. The hitch pin 66 in the locked position couples the slide box 30 to the receiver 12 and the hitch 44. When the hitch pin 66 is in the locked position coupled to the receiver 12 the hitch 44 and the slide box 30, the hitch 44 and receiver 12 are not movable laterally.

Figure 3A:
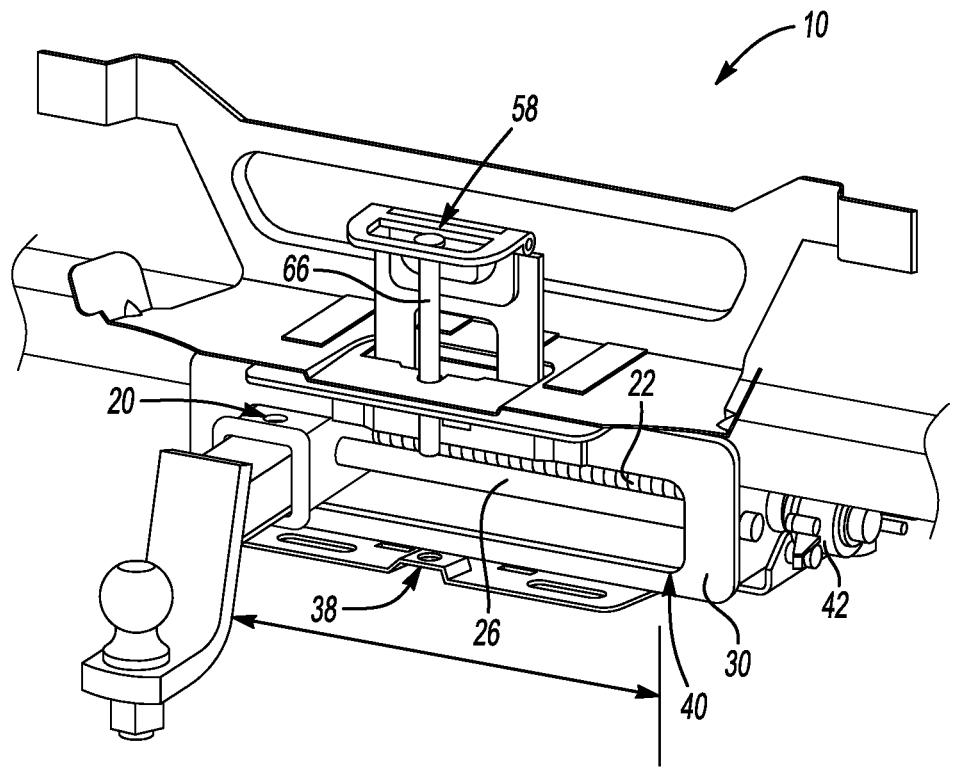
FIG. 3A is a perspective view of the example hitch assembly in a first position.

Referring to FIG. 3A with continued reference to FIGS. 1 and 2, the example hitch assembly 10 is shown in a lateral most position away from a center point to one side of front opening 40 of the slide box 30. Movement to the lateral position illustrated in FIG. 3A is accomplished by driving the worm shaft 22 that is engaged to the worm gear 14 disposed on the receiver 12. Rotation of the worm shaft 22 causes lateral movement of the worm gear 14 fixed to the receiver 12 such that the receiver 12 slides along the slide bar 26 laterally.

Figure 3B:
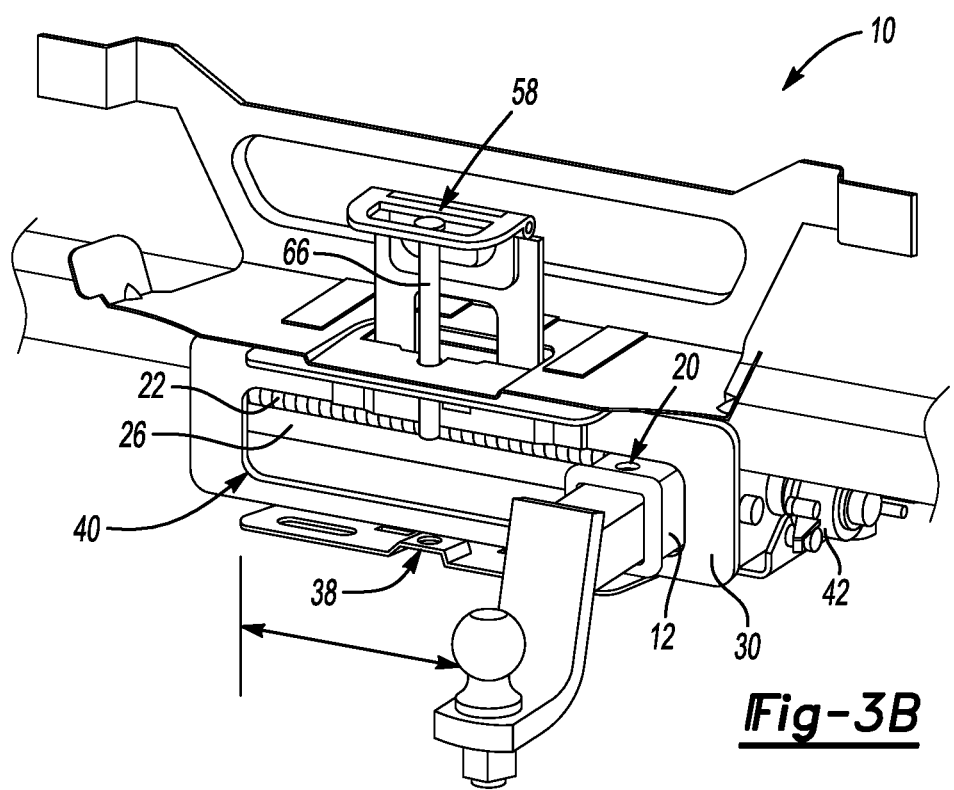
FIG. 3B is a perspective view of the example hitch assembly in a second position.

Referring to FIG. 3B with continued reference to FIGS. 1 and 2, the hitch 44 shown in a laterally opposite position from the lateral position shown in Figure A to show the length of travel provided by the laterally articulating hitch assembly 10. It should be appreciated that the front opening 40 could be sized differently to provide more or less lateral range of movement as is desired and is within the contemplation and scope of this disclosure. Movement of the hitch 44 enables the ball 48 to be adjusted to accommodate misalignment of the vehicle to a trailer hitch.

Figure 4:
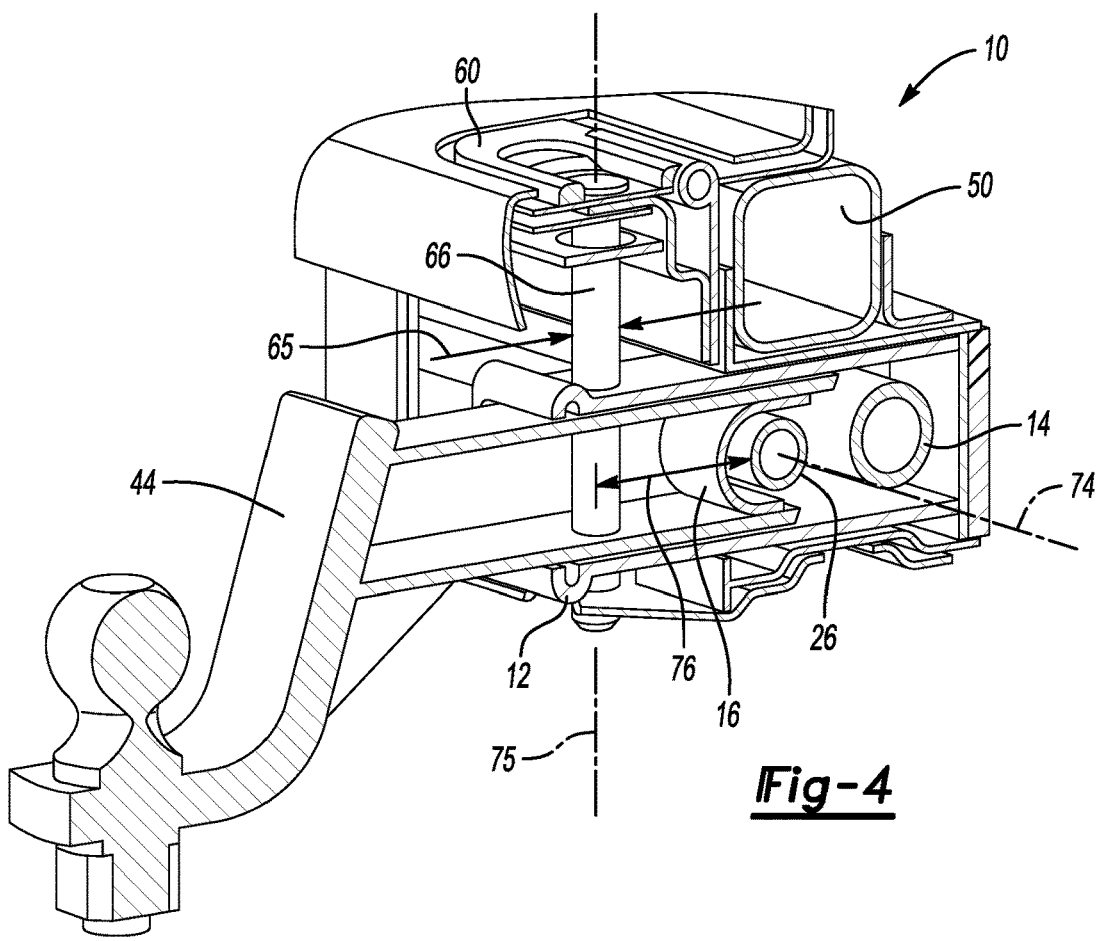
FIG. 4 is a cross-sectional view of a portion of the example hitch assembly in a locked condition.
Figure 5:
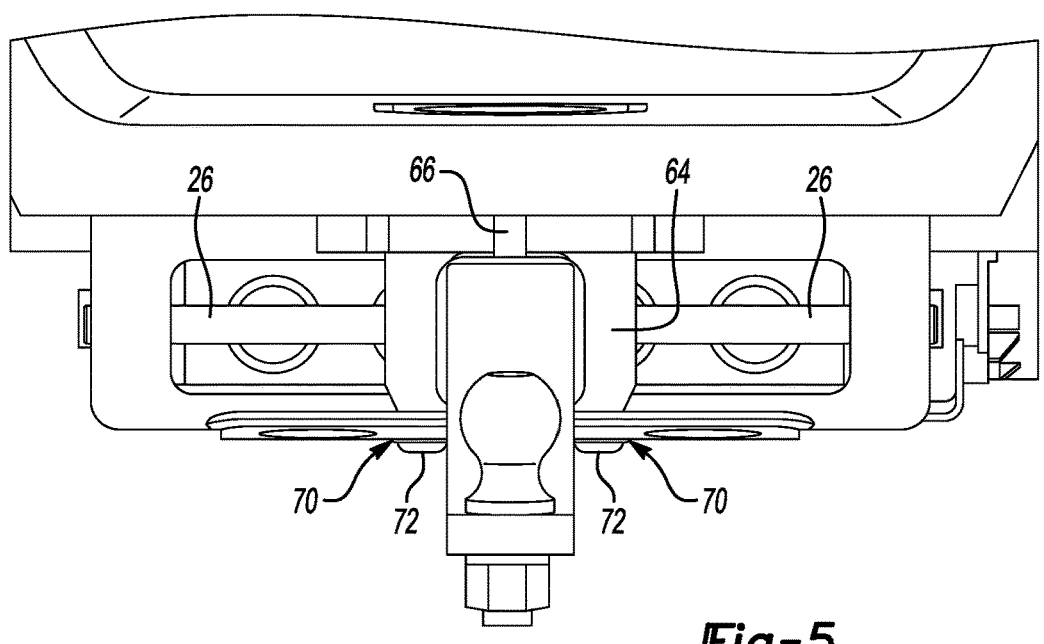
FIG. 5 is a front view of the example hitch assembly in a locked position.

Referring to FIGS. 4 and 5 the example hitch assembly 10 is illustrated in a locked position. In the locked position the hitch pin 66 couples the slide box 30, hitch receiver 12 and hitch 44 together in the center of the front opening 40. Coupling of the hitch 44, receiver 12 and slide box 30 disables movement of the receiver 12 and the hitch 44 during towing operations to remove any load on the adjustment mechanism provided by the worm gear 14, worm shaft 22 and motor 42. Accordingly, lateral loads exerted by the hitch 44 are communicated through the receiver 12 to the beam 50. Accordingly, no lateral forces are exerted on the worm shaft 22 or the slide bar 26.

Additionally, the hitch pin assembly 58 includes the locking brackets 64 that extends on either outer side of the receiver 12 and are received within slots 70 in the bottom 36. The locking bracket 64 provides a further load path to the static structure of the vehicle to remove loads from the drive mechanism. Instead, forces on the hitch 44 are transferred through the slide box 30 to the static structure of the vehicle.

Additionally, the hitch pin 66 is disposed along a vertical axis 75 that is spaced a part from a horizontal axis 74 of the slide bar 26. A distance between a vertical axis 75 and the horizontal axis 74 is schematically shown at 76. The distance 76 is maximized to provide a rigidity of the hitch 44 in a pitch direction about the horizontal axis 74. The distance 76 is maximized to provide a large moment arm that prevents up and down movement from being transmitted to the drive mechanism.

In one disclosed embodiment the distance 76 is greater than approximately four times a width 65 of the hitch pin 66. In another example the distance 76 is between four and eight times the width 65 of the hitch pin 66. The width 65 of the hitch pin 66 in this disclosed embodiment correspond with the diameter. However, it is within the contemplation of this disclosure that the hitch pin 66 may be square or rectilinear in which case the width would be that width in direction disposed in a direct toward the horizontal axis 74.

Moreover, it should be appreciated that although the slide bar 26 is shown aft of the worm shaft 22, it is within the contemplation of this disclosure that the slide bar 26 could be on the other side or forward of the slide bar 26 as shown to enable maximization of the distance 76. Furthermore, other configurations and relative orientations of the slide bar 26 and the worm shaft 22 that enable the distance 76 to provide the desired rigidity are also within the contemplation of this disclosure.

Figure 6:
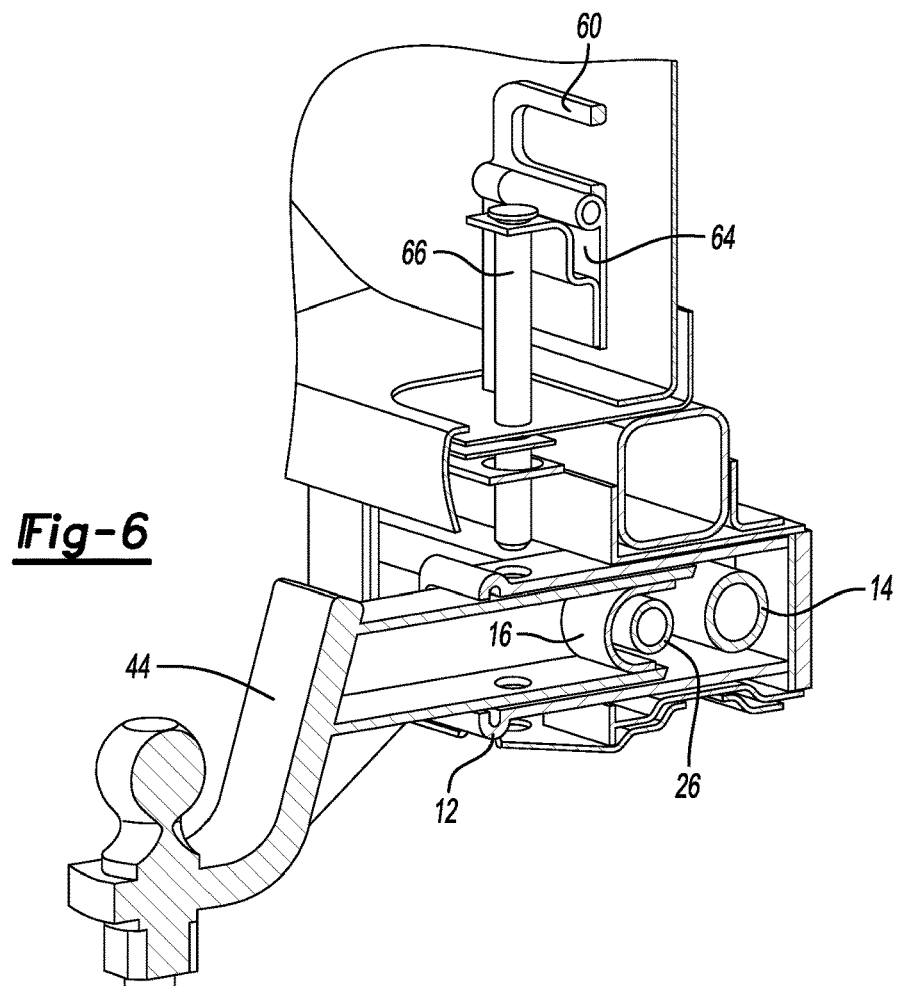
FIG. 6 is a cross-sectional view of the example hitch assembly in an unlocked position.
Figure 7:
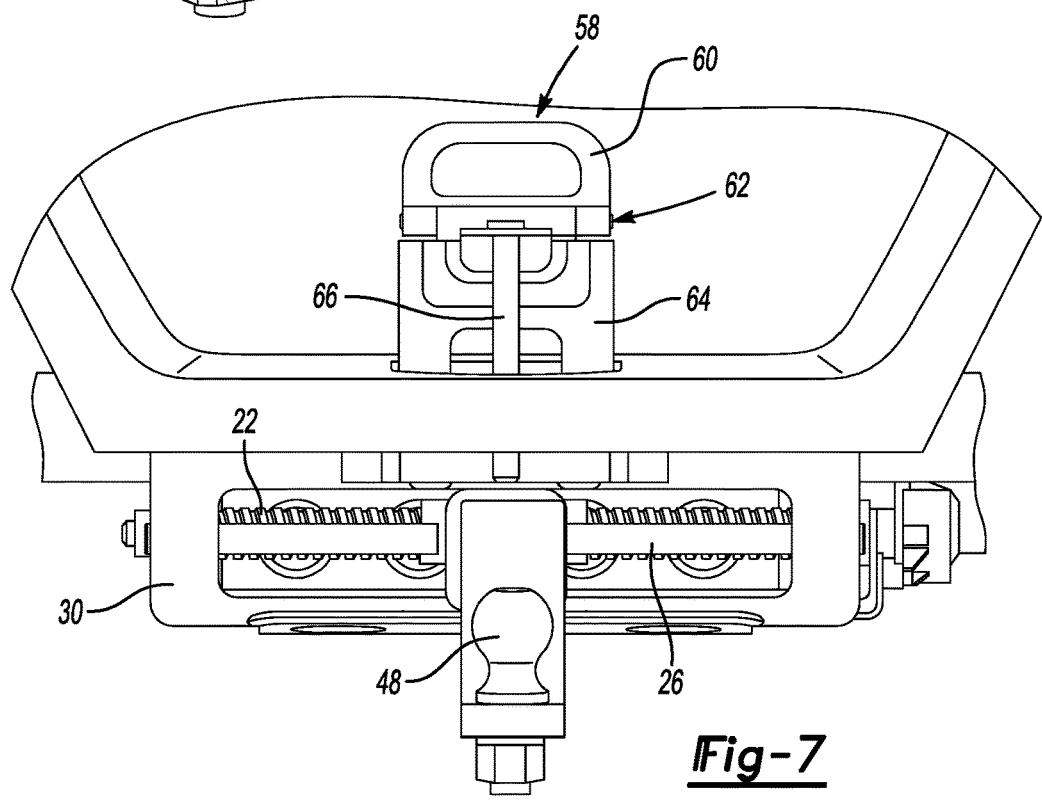
FIG. 7 is a front view of the example hitch assembly in the unlocked position.

Referring to FIGS. 6 and 7 the hitch pin assembly 58 is shown in an unlocked position that enables lateral movement of the receiver 12 and hitch 44. In the unlocked position the hitch pin 66 is pulled clear of the openings in the receiver 12, hitch 44 and slide box 30. Also pulled clear of the receiver 12 is the locking bracket 64. Locking bracket 64 is pulled upward past the receiver 12 such that the tabs 72 are out of the slot 70 and arms of the bracket 64 are no longer surrounding either side of the receiver 12.

Figure 8:
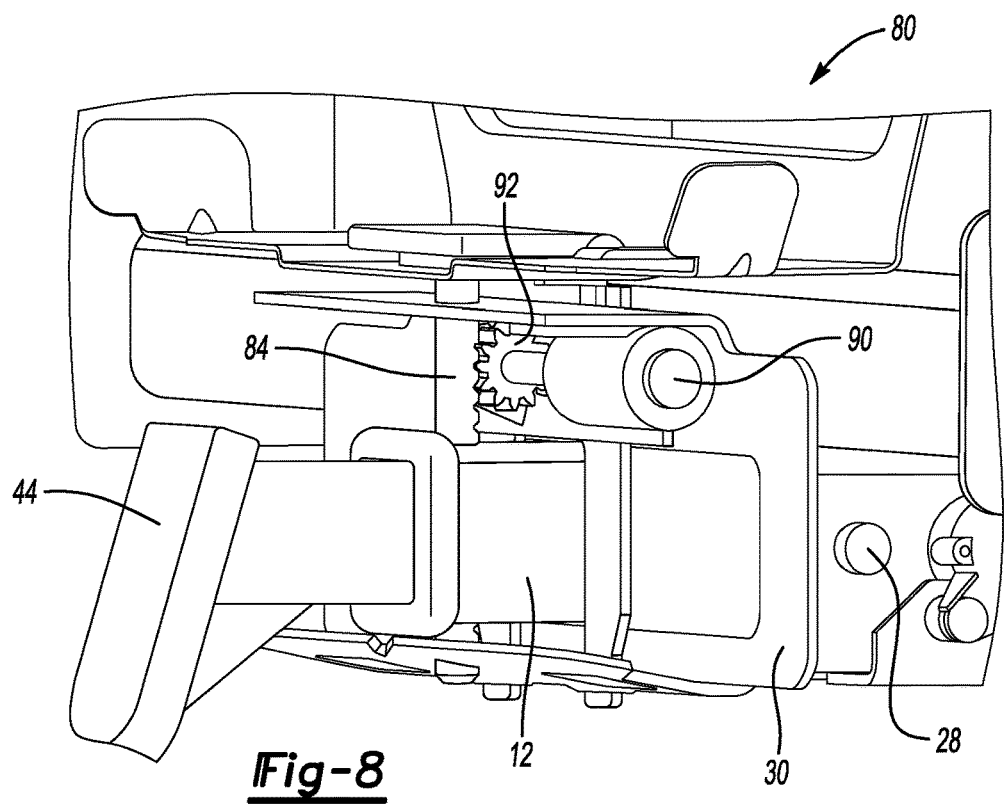
FIG. 8 is a perspective view of another example hitch assembly embodiment.
Figure 9:
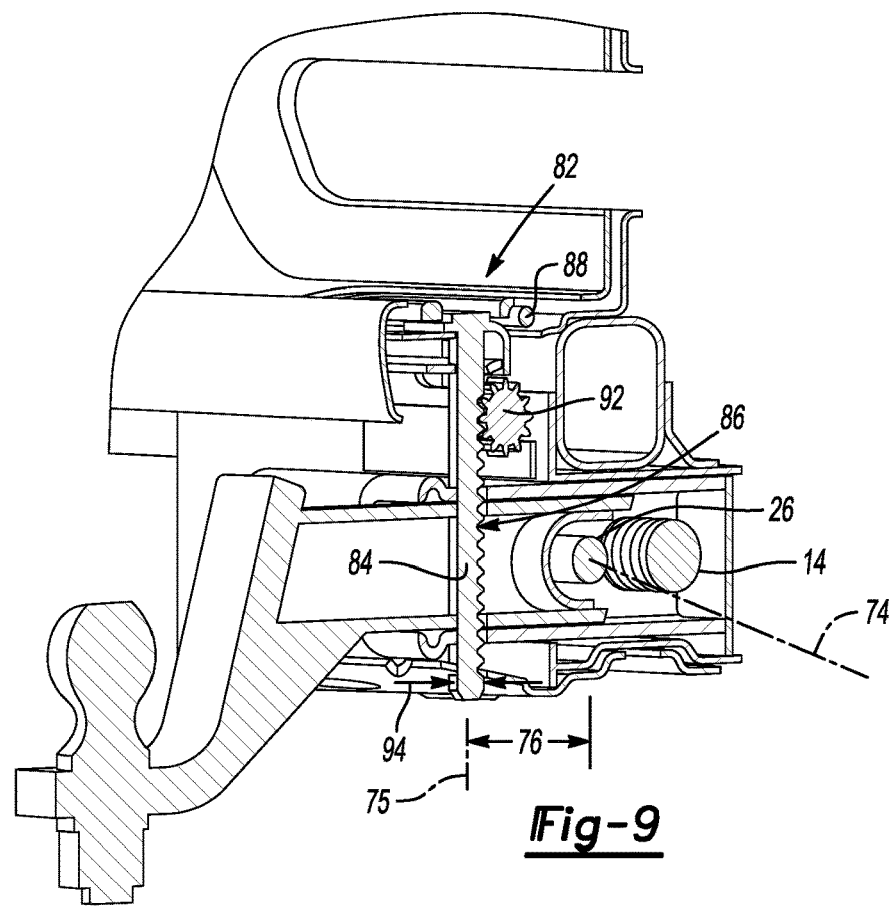
FIG. 9 is a cross-sectional view of the example hitch assembly of FIG. 8 in a locked position.

Referring to FIGS. 8 and 9 another example laterally articulating hitch assembly 80 is shown and includes an actuator 90 that is engaged to a geared hitch pin 84. The actuator 90 includes a drive gear 92 to move the hitch pin 84 along the vertical axis 75. The receiver 12 includes opening 20 that is aligned with the hitch pin 84 and with openings in the hitch 44 and the slide box 30.

The hitch pin 84 includes gear teeth 86 that are engaged to the drive gear 92. The actuator 90 can be automatically actuated by a vehicle operator from remotely within the vehicle cabin or may also be controlled by other means by the vehicle operator outside the vehicle. Additionally, the actuator 90 and motor 42 may also may be automatically actuated by control systems utilizing sensors and other vehicle systems such as a rear view camera to locate and align the hitch ball 48 with a trailer hitch assembly.

In this example the hitch locking pin assembly 82 includes a bracket 88 that surrounds the receiver 12 when in a locked position. The hitch pin 84 includes the teeth 86 and is provided at a width 94. The teeth 86 are part of rack that is engaged to the drive gear 92 for moving the hitch pin 84 between a coupled position and an unlocked position.

A distance 76 between a vertical axis 75 of the hitch pin 84 and a horizontal axis 74 of the slide bar 26 is provided to reduce and substantially prevent pitch movements about the horizontal axis 74. Accordingly, the distance 76 is predetermined within the hitch assembly 80 to absorb and prevent pitching movement. In one disclosed embodiment, the distance 76 is at least 4 times the width 94 of the hitch pin 84. In another disclosed embodiment the distance 76 is greater than four times and less than ten times the width 94. The width 94 maybe a diameter for a round hitch pin 84 or a width in a direction perpendicular to the horizontal axis 74 for square or rectilinear shaped pin.

Additionally, while the hitch pin 84, slide bar 26 and worm shaft 22 are all depicted in an example relative orientation, other relative orientations, such as the slide bar 26 being on the other side or forward of the worm shaft 22 are within the contemplation of this disclosure. Such alternate orientations that would provide a desired distance 76 between the hitch pin 84 and the slide bar 26 to provide a desired rigidity are within the contemplation of this disclosure.

Figure 10:
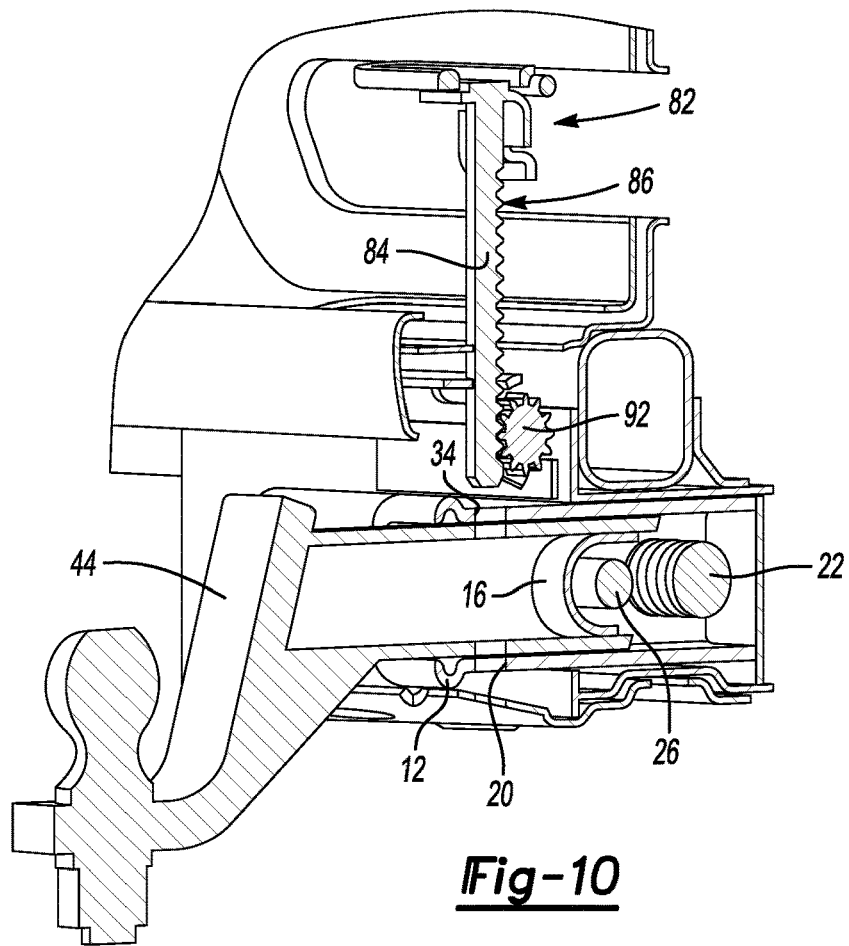
FIG. 10 is a cross-sectional view of the example hitch assembly in an unlocked position.
Figure 11:
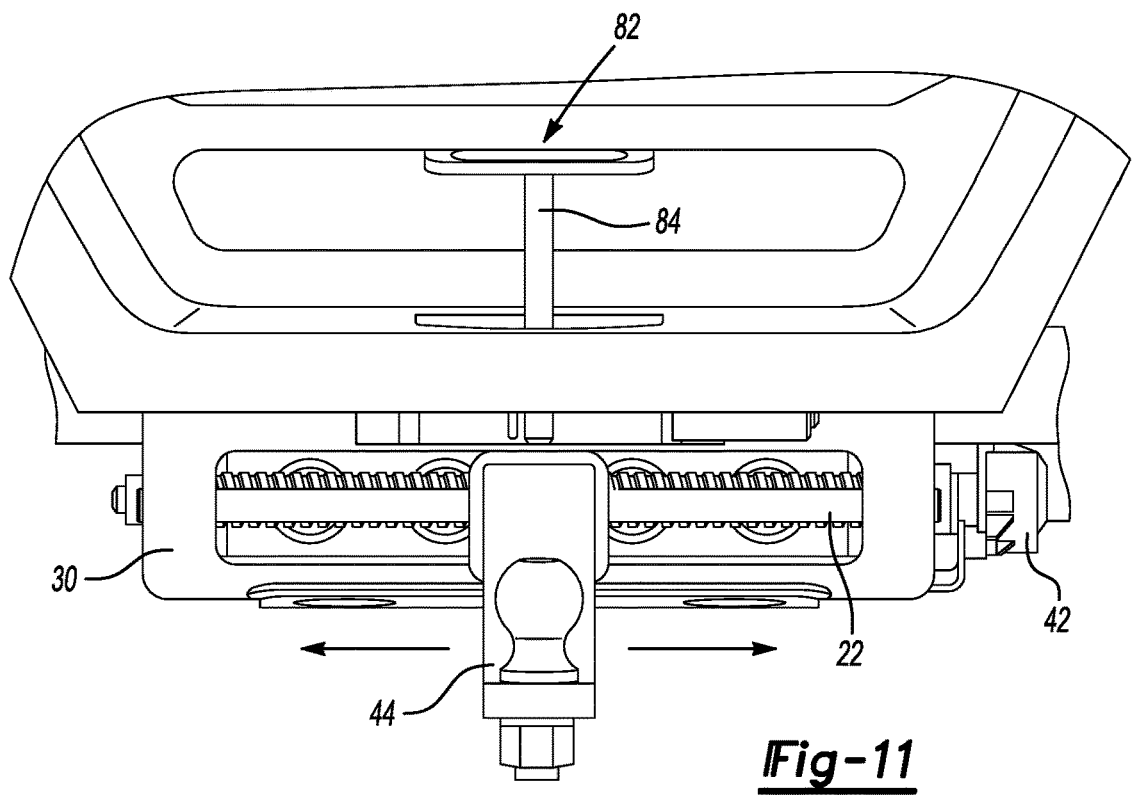
FIG. 11 is a front view of the example hitch assembly in an unlocked position.

Referring to FIGS. 10 and 11 the example hitch assembly 80 is shown in an unlocked position where the actuator 90 has driven the hitch pin 84 and thereby the bracket 88 free of the receiver 12. Once the hitch pin 84 has been removed from the openings the receiver 12 and hitch 44 are movable lateral within the front opening 40 of the slide box 30 by operation of the motor 42.

Accordingly the example hitch assembly is laterally movable to provide adjustment for alignment to a trailer hitch without further movement or readjustment of a vehicle. Additionally, the hitch pin is coupled to the receiver 12 and hitch 44 in a predefined configuration to prevent loads and forces on the hitch 44 from being transferred to the drive mechanism. Instead, the forces and loads are transferred to the vehicle static structures.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A hitch receiver assembly comprising:
   a receiver including a worm gear and a slide bushing;
   a worm shaft engaged to the worm gear for laterally moving the receiver;
   a slide bar extending through the slide bushing and fixed at each end to a static structure;
   a hitch pin configured to couple a hitch to the receiver and the static structure, wherein the hitch pin is movable along a vertical axis and the slide bar is disposed along a horizontal axis spaced a distance apart from the vertical axis, wherein the first distance is no less than 4 times a width of the hitch pin.

2. The hitch receiver assembly as recited in claim 1, wherein the static structure includes a slide box, the slide box supporting rotation of the worm shaft and includes fixed sides supporting the slide bar.

3. The hitch receiver assembly as recited in claim 2, wherein the slide bushing comprises a running fit to the slide bar such that the receiver is movable laterally along the slide bar.

4. The hitch receiver assembly as recited in claim 2, including a motor rotating the worm shaft to move the receiver laterally relative to the slide box.

5. The hitch receiver assembly as recited in claim 2, wherein the slide box includes openings vertically aligned with openings within the receiver and the hitch and in a coupled position the hitch pin is configured to extend through openings in the slide box, the receiver and the hitch to couple the hitch to the static structure.

6. The hitch receiver assembly as recited in claim 5, including a handle pivotally attached to the hitch pin, the handle movable from a stowed position to an extended position for withdrawal from the receiver and hitch to a decoupled position.

7. The hitch receiver assembly as recited in claim 4, wherein the hitch pin includes a gear portion engaged to an actuator for moving the receiver pin between the coupled position and a decoupled position.

8. The hitch receiver assembly as recited in claim 5, wherein the hitch pin is received vertically through the openings.

9. The hitch receiver assembly as recited in claim 1, wherein the distance between the vertical axis and the horizontal axis is between 4 and 8 times a width of the hitch pin.

10. A hitch receiver assembly comprising:
a slide box attached to a static structure;
a receiver movable within the slide box and including a worm gear and a bushing;
a worm shaft engaged to the worm gear;
a slide bar extending along a horizontal axis through the bushing;
a hitch received within the receiver; and
a hitch pin extending along a vertical axis through the hitch, the receiver and the slide box, the vertical axis spaced apart from the horizontal axis a distance no less than 4 times a width of the hitch pin.

11. The hitch receiver assembly as recited in claim 10, wherein the distance is between 4 and 8 times a width of the hitch pin.

12. The hitch receiver assembly as recited in claim 10, wherein the slide box supports rotation of the worm shaft and fixed sides holding the slide bar.

13. The hitch receiver assembly as recited in claim 10, including a motor rotating the worm shaft to move the receiver laterally relative to the slide box.

14. The hitch receiver assembly as recited in claim 10, wherein the slide box includes openings vertically aligned with openings within the receiver and the hitch and in a coupled position the hitch pin extends through openings in the slide box, receiver and hitch to couple the hitch to the static structure, wherein a handle is pivotally attached to the hitch pin and is movable from a stowed position to an extended position for withdrawing the receiver pin to a decoupled position.

15. The hitch receiver assembly as recited in claim 10, wherein the slide box includes openings vertically aligned with openings within the receiver and the hitch and in a coupled position the receiver pin extends through openings in the slide box, receiver and hitch to couple the hitch to the slide box, the hitch pin including a gear portion engaged to an actuator for moving the hitch pin between the coupled position and a decoupled position.

16. A method of assembling a hitch receiver assembly comprising:
fixing a slide box to a static structure;
assembling a bushing and a worm gear to a receiver and placing the receiver into a space defined within the slide box;
placing a worm shaft into engagement with the worm gear;
fixing a slide bar along a horizontal axis through the bushing and sides of the slide box;
inserting a hitch into the receiver; and
coupling the hitch, receiver and slide box together with a hitch pin extending along a vertical axis that is spaced apart from the horizontal axis a distance no less than 4 times a width of the hitch pin.

17. The method as recited in claim 16, including coupling a motor to the worm shaft to drive the receiver laterally within the slide box.

18. The method as recited in claim 17, including coupling an actuator to gear teeth on the receiver pin to move the receiver pin between a coupled position and a decoupled position.

* * * * *